(12) United States Patent  
Lieb et al.

(10) Patent No.: US 8,892,989 B1  
(45) Date of Patent: Nov. 18, 2014

(54) METHOD FOR SEARCHING COMPANIES AND PEOPLE

(75) Inventors: Adam Michael Lieb, San Francisco, CA (US); James L. Benton, San Francisco, CA (US)

(73) Assignee: Clearslide, Inc., San Francisco, CA (US)

( * ) Notice: Subject to any disclaimer, the term of this patent is extended or adjusted under 35 U.S.C. 154(b) by 263 days.

(21) Appl. No.: 13/219,444

(22) Filed: Aug. 26, 2011

Related U.S. Application Data

(60) Provisional application No. 61/377,274, filed on Aug. 26, 2010.

(51) Int. Cl.
*G06F 17/00* (2006.01)
*G06F 3/01* (2006.01)

(52) U.S. Cl.
CPC .......................................... *G06F 3/01* (2013.01)
USPC .......................................... 715/206; 715/205

(58) Field of Classification Search
CPC .......................................................... G06F 3/01
USPC .................................................. 715/205, 206
See application file for complete search history.

(56) References Cited

U.S. PATENT DOCUMENTS

| | | | |
|---|---|---|---|
| 5,737,726 A * | 4/1998 | Cameron et al. | 705/7.21 |
| 6,049,796 A * | 4/2000 | Siitonen et al. | 707/711 |
| 7,805,492 B1 * | 9/2010 | Thatcher et al. | 709/206 |
| 8,036,924 B2 * | 10/2011 | Putnam et al. | 705/7.12 |
| 8,255,248 B1 * | 8/2012 | Del Favero et al. | 705/7.11 |
| 2001/0047305 A1 * | 11/2001 | Bowen, Jr. | 705/26 |
| 2002/0013369 A1 * | 1/2002 | Fujimoto et al. | 514/567 |
| 2002/0133369 A1 * | 9/2002 | Johnson | 705/1 |
| 2003/0004837 A1 * | 1/2003 | Myers et al. | 705/27 |
| 2003/0158855 A1 * | 8/2003 | Farnham et al. | 707/102 |
| 2003/0182232 A1 * | 9/2003 | Zeltzer et al. | 705/51 |
| 2005/0182743 A1 * | 8/2005 | Koenig | 707/1 |
| 2006/0206454 A1 * | 9/2006 | Forstall et al. | 707/3 |
| 2006/0282427 A1 * | 12/2006 | Shurtleff et al. | 707/5 |
| 2007/0233692 A1 * | 10/2007 | Lisa et al. | 707/10 |
| 2007/0233693 A1 * | 10/2007 | Baxter et al. | 707/10 |
| 2008/0134088 A1 * | 6/2008 | Tse et al. | 715/810 |

* cited by examiner

*Primary Examiner* — William Bashore
*Assistant Examiner* — Gregory A Distefano
(74) *Attorney, Agent, or Firm* — Perkins Coie LLP

(57) ABSTRACT

A method for searching companies and contacts is described. The user is able to search companies, contacts or both companies and contacts simultaneously. Search results are updated in real time so the user can intelligently refine the criteria. Users can select multiple companies and find matching contacts all from one place, or search contacts irrespective of companies.

19 Claims, 7 Drawing Sheets

Contacts | Assign To: Me ▼

- title ⊕
- level ⊕
- department ⊕
- country ⊕
- state ⊕
- metro ⊕
- area-code ⊕
- zip-code ⊕
- first-name ⊕
- last-name ⊕
- email ⊕
- (reset all)
- ☐ Quick-Buy
  Purchase the direct
  phone + email now
  (vs. later from Saved
  Leads)

Saved: 0

Companies

- company name ⊕
- industry ⊕
- employees ⊕
- revenue ⊕
- ownership ⊕
- website-type ⊕
- fortune-rank ⊕
- country ⊕
- state ⊕
- metro ⊕
- area-code ⊕
- zip-code ⊕
- (reset all)

*FIG. 1*

| company name ⊕ | Companies (351) select all \| none | | | Contacts \| Assign To: [Me] ▶ | title ⊕ |
|---|---|---|---|---|---|
| [Add] | Name | Location | # | | level ⊕ |
| industry ⊕ | Chevron Corporation | San Ramon CA USA | ☒ 12578 | | department ⊕ |
| [choose industry ▽] | Shell Oil Company | Houston TX USA | ☒ 5328 | | country ⊕ |
| Energy & Utilities × | BP p.l.c | St James'S 8001 United Kingdom | ☒ 4484 | | state ⊕ |
| employees ⊕ | CH2M HILL Companies, Ltd. | Englewood CO USA | ☒ 2867 | | metro ⊕ |
| revenue ⊖ | Duke Energy Corporation | Charlotte NC USA | ☒ 2779 | | area-code ⊕ |
| [0-1m] [1m-10m] [10m-50m] | EMCOR Group, Inc. | Norwalk CT USA | ☒ 2662 | | zip-code ⊕ |
| [50m-100m] [100m-250m] | ConocoPhillips Company | Houston TX USA | ☒ 2638 | | first-name ⊕ |
| [250m] [250m-500m] | CenterPoint Energy, Inc. | Houston TX USA | ☒ 2470 | | last-name ⊕ |
| [500m-1b] [1b+] | Schlumberger Limited | Houston TX USA | ☒ 2303 | | email ⊕ |
| ownership ⊕ | Halliburton Company | Houston TX USA | ☒ 2126 | | (reset all) |
| website-type ⊕ | Southern California Edison | Rosemead CA USA | ☒ 1978 | | ☐ Quick-Buy Purchase the direct phone + email now (vs. later from Saved Leads) |
| fortune-rank ⊕ | Waste Management, Inc. | Houston TX USA | ☒ 1938 | | |
| country ⊕ | Southern Company | Atlanta GA USA | ☒ 1854 | | |
| state ⊕ | Archer-Daniels-Midland Company | Decatur IL USA | ☒ 1841 | | |
| metro ⊕ | United Technologies Corporation | Hartford CT USA | ☒ 1769 | | Saved: 0 |
| area-code ⊕ | | | | | |
| zip-code ⊕ | | | | | |
| (reset all) | | | | | |

Companies (351) select all | none

| Name | Location | # |
|---|---|---|
| Chevron Corporation | San Ramon CA USA | 12578 |
| Shell Oil Company | Houston TX USA | 5328 |
| BP p.l.c | St. James's 8001 United Kingdom | 4484 |
| CH2M HILL Companies, Ltd. | Englewood CO USA | 2867 |
| Duke Energy Corporation | Charlotte NC USA | 2779 |
| EMCOR Group, Inc. | Norwalk CT USA | 2662 |
| ConocoPhillips Company | Houston TX USA | 2638 |
| CenterPoint Energy, Inc. | Houston TX USA | 2470 |
| Schlumberger Limited | Houston TX USA | 2303 |
| Halliburton Company | Houston TX USA | 2126 |
| Southern California Edison | Rosemead CA USA | 1978 |
| Waste Management, Inc. | Houston TX USA | 1938 |
| Southern Company | Atlanta GA USA | 1854 |
| Archer-Daniels-Midland Company | Decatur IL USA | 1841 |
| United Technologies Corporation | Hartford CT USA | 1769 |

Filters (left panel):
- company name: [Add]
- industry: choose industry
- Energy & Utilities x
- employees
- revenue: 0-1m | 1m-10m | 10m-50m | 50m-100m | 100m-250m | 250m-500m | 500m-1b | 1b+
- ownership
- website-type
- fortune-rank
- country
- state
- metro
- area-code
- zip-code
- (reset all)

Contacts (10k) | Assign To: [Me]

| Title | Company | Name/Location |
|---|---|---|
| XI Architecture | BP p.l.c. | Manish/Bhalla, St. James's, 8001 4420 |
| Works General Manager | BP p.l.c. | Micheal Olbrich, Charleston, SC 843 |
| Work/Life Coordinator | BP p.l.c. | Lisa Marrufo, Houston, TX 281 |
| Wintel | BP p.l.c. | Alex Vo, St. James's, 8001 281 |
| Wild Bean Café Category Manage | BP p.l.c. | TJ Callahan, Naperville, IL 630 |
| Whiting Procurement | BP p.l.c. | Cheryl Stevens, Whiting, IN 219 |
| Whiting Business Unit Business Development | BP p.l.c. | Jay Huseth, St. James's, 8001 4421 |
| West Coast Direct Sales Manager | BP p.l.c. | Fred Miller, Houston, TX 281 |
| West Category Manager-Beverage | BP p.l.c. | Phil Smallwood, Houston, TX 714 |
| Wellsite Leader-GOM DWP, Centralized Drlg and Completions Team | BP p.l.c. | William Brown, Houston, TX 281 |
| Wellsite Geologist-Mad Dog SPAR, BP Deepwater | BP p.l.c. | Stuart D Hemming, St. James's, |

Filters (right panel):
- title
- level
- department
- country
- state
- metro
- area-code
- zip-code
- first-name
- last-name
- email
- (reset all)
- ☐ Quick-Buy Purchase the direct phone + email now (vs. later from Saved Leads)
- Saved: 0

FIG. 5

Companies company name ⊕
industry ⊕
employees ⊕
revenue ⊕
ownership ⊕
website-type ⊕
fortune-rank ⊕
country ⊕
state ⊕
metro ⊕
area-code ⊕
zip-code ⊕
(reset all)

Contacts (100k) | Assign To: [Me ▽]

| Title | Company | Name/Location |
|---|---|---|
| Zone Vice President of Sales West Region | Bayer Corporation | Bruce Kraus West Haven, CT 203 |
| Zone Vice President of Sales East Region | Bayer Corpopration | John Magee West Haven, CT 203 |
| Zone Vice President of Sales Central Region | Bayer Corporation | Michael Webber West Haven, CT 203 |
| Zone Head Marketing-North-Assistant Vice President | Tata AIG Insurance Company Ltd. | Gaurav Bhatnager New Dehli, 3001 9122 |
| x V-P, General Manager | GKN Walterscheid inc | William C Heffeman Woodridge, IL 630 |
| Worldwide Vice-President Global Strategic Marketing Group for Hematology and Onocology | Johnson & Johnson | Pauline Ho New Brunswick, NJ 908 |
| Worldwide Vice-President, Sales | International Business Machines Coorporation (IBM) | Dave Jursik Armonk, NY 914 |
| Worldwide Vice-President Virology Global Strategic Marketing | Johnson & Johnson | Cameron Durrant New Brunswick NJ 732 | title ⊕
level ⊖
[C-level] [VP] [Director] [Manager] [Staff]
department ⊖
[sales] [marketing] [finance] [HR] [support] [eng] [ops] [IT] [other]
country ⊕
state ⊕
metro ⊕
area-code ⊕
zip-code ⊕
first-name ⊕
last-name ⊕
email ⊕
(reset all)

☐ Quick-Buy
Purchase the direct phone + email now (vs. later from Saved Leads)

Saved: 0

*FIG. 7*

METHOD FOR SEARCHING COMPANIES AND PEOPLE

CROSS-REFERENCED TO RELATED APPLICATIONS

This application claims the benefit of U.S. Provisional Application No. 61/377,274 entitled "METHOD FOR SEARCHING COMPANIES AND PEOPLE", filed Aug. 26, 2010, and is hereby incorporated by reference in its entirety.

TECHNICAL FIELD

The method relates to a computer user interface for finding people and companies. More specifically, the method provides a means to search companies, people, or companies and people simultaneously using multiple search criteria all from the same screen.

BACKGROUND

To be able to locate companies and contacts is important to many businesses. For example, sales people often need to find new potential customers which may be interested in their products or services. Or, recruiters may want to find prospective candidates at other companies.

Several online databases exist that allow users to search for companies and contacts. However, those systems are often cumbersome and difficult to use. For example, some systems require the user to navigate through many pages and options to find contacts (search companies, choose one company, search people at that company, go back to company search page and start over, etc). Users are not able to use both company filters and contact filters at the same time. Also, the systems do not often provide feedback as to how many results may be available. So the user will spend time setting many criteria in hopes of finding the perfect matches, only to be told there are no matches.

SUMMARY

This system provides a method to search companies and contacts in one view. Whenever a user sets a search criteria, the results are updated immediately, so the user can see how many results are available and whether they match what they were looking for. Users can search using only company filters, only contact filters, or use both simultaneously. Users can select companies and the list of contacts at those companies will update. Users can "roll-over" a company or contact to get additional information. Then users can save, assign, and/or purchase contacts.

BRIEF DESCRIPTION OF DRAWINGS

FIG. 1. shows an example of the initial state of the user interface.

FIG. 2. shows an example of company criteria set.

FIG. 4. shows an example of selected companies with matching contacts.

Figure 5:
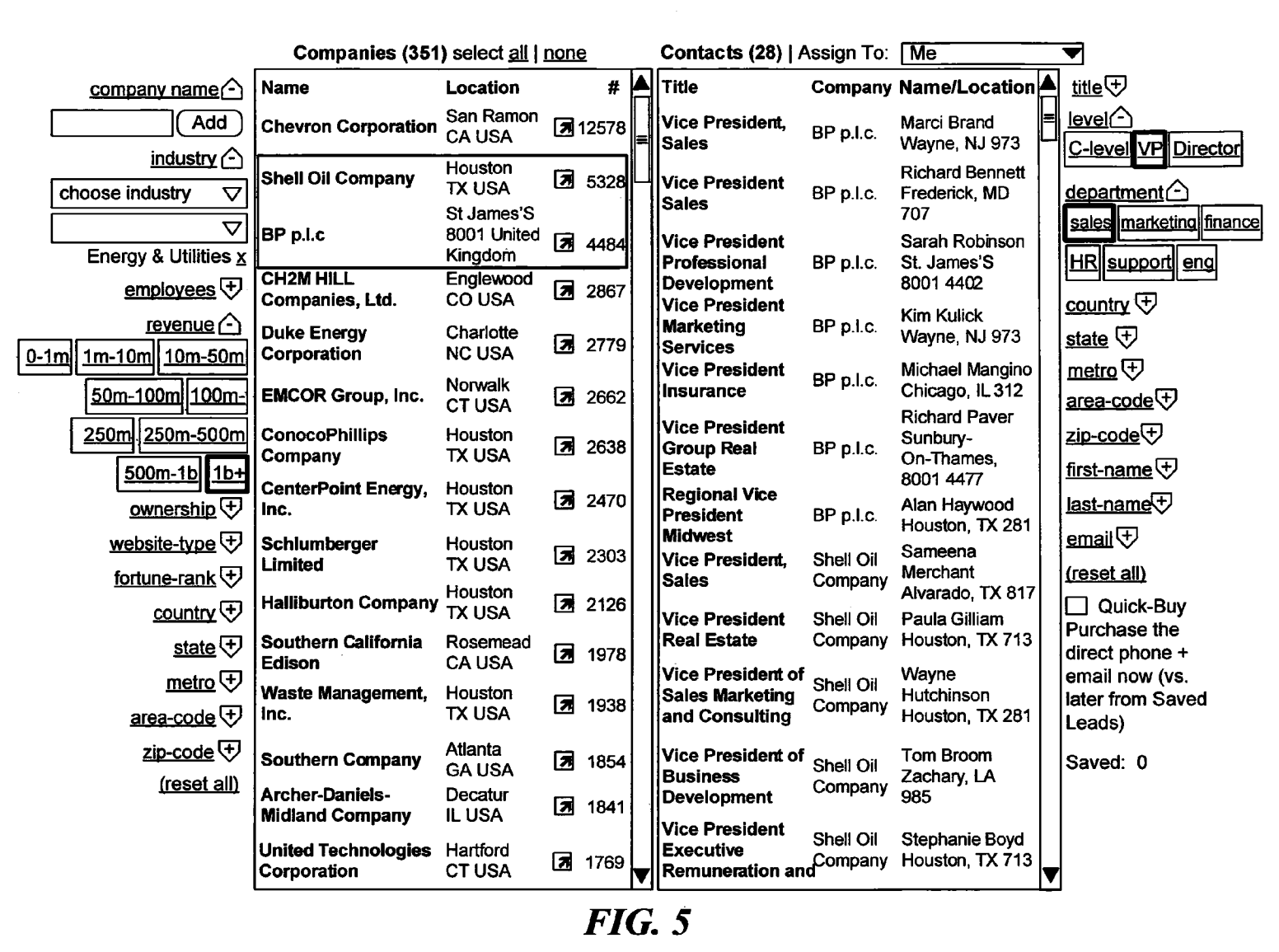

FIG. 5. shows an example of selected companies with contact criteria set.

FIG. 7. shows an example of a search with only contact criteria set.

DETAILED DESCRIPTION

Finding Companies

Figure 3:
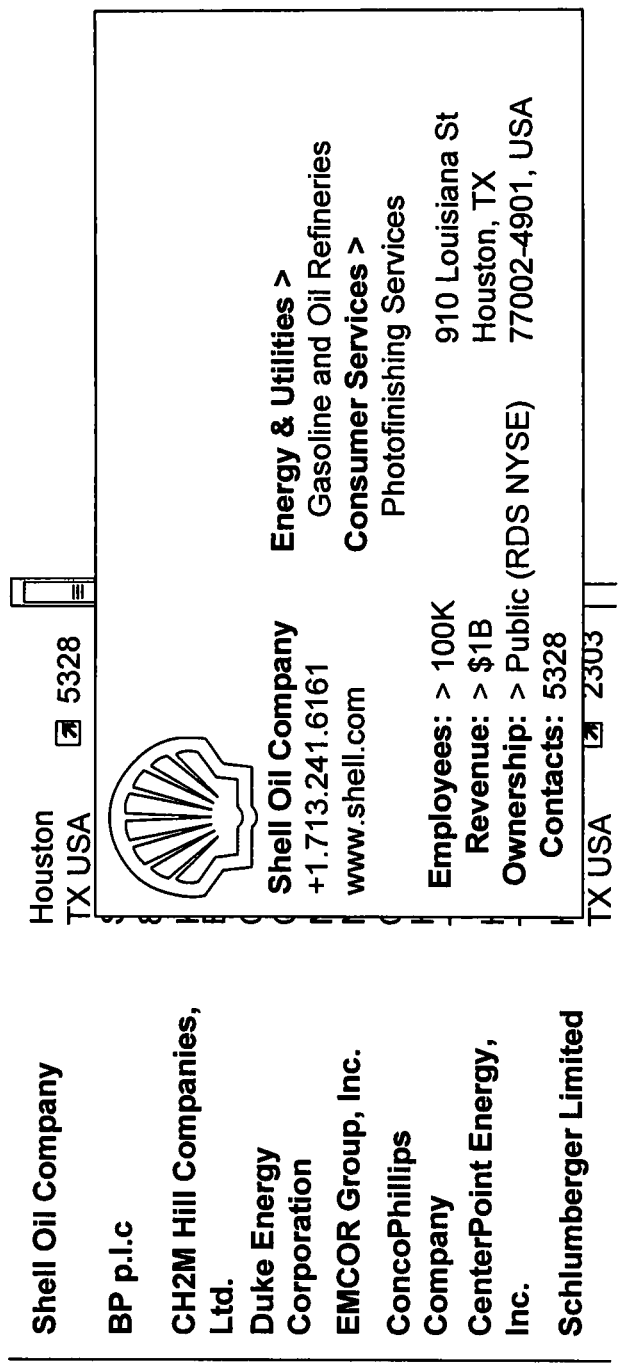
FIG. 3. shows an example of the roll-over company informational window.
Figure 6:
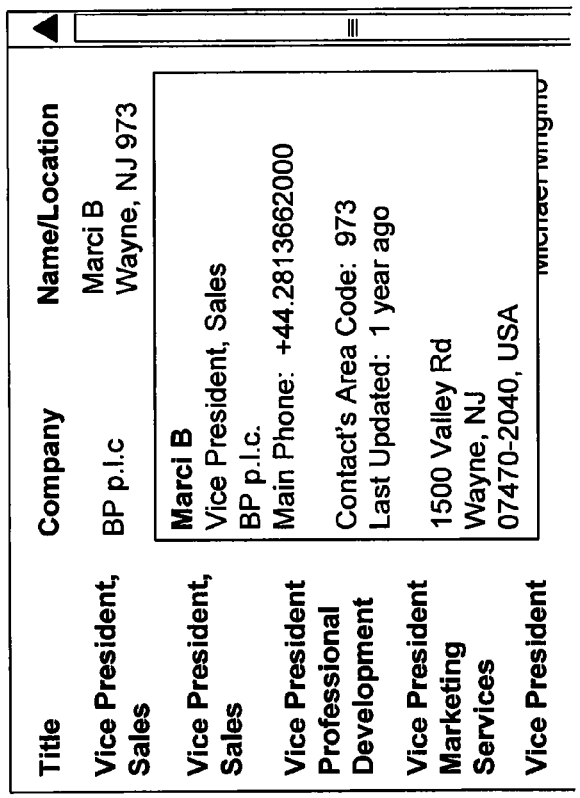
FIG. 6. shows an example of roll-over contact informational window.

Users can start by selecting company search criteria. There are multiple formats of company criteria, including text-entry, choosing from one or more values from a list of options, and multidimensional options (e.g. industry and sub-industry). Whenever the user makes a change (by adding or removing criteria) the system immediately updates the list of matching companies. This way the user can continuously confirm that the companies match their needs and they don't "over-filter" and cut the list down too deeply.

Learning More about Companies

When the user hovers their mouse over a company, the system displays an additional overlay mini-window, which contains additional company details (including: industry, size, address, number of contacts, etc). Likewise, the user can click on the icon to view the company's website in another window.

Selecting Companies

The user can click on one or more companies to select those companies. As they select companies, the list of contacts on the right updates in real time. They can also select "all companies" in which case the system will display all the contacts from all matching companies.

Finding Contacts

Likewise, the user can filter contacts by selecting one or more contact criteria Whenever the user makes a change (by adding or removing criteria) the system immediately updates the list of matching contacts.

Learning More About Contacts

When the user hovers their mouse over a contact, the system displays an additional overlay mini-window, which contains additional contact details (including: the contact's title, address, the main phone number for the company, the last time the contact record was updated, etc).

Saving and Purchasing Contacts

The user can click on a contact to select it. The system can then "save" the contact for later retrieval. The user can select who the contact should be assigned to by using the pulldown at the top.

Also, the user can decide to "purchase" the contact. Purchased contacts may have additional data fields available, such as direct phone number and email, which are not otherwise available.

Searching Contacts Irrespective of Companies

The user does not need to search for companies first. Instead, the user can start by selecting one or more contact criteria, and the list of matching contacts will update in real time, irrespective of which company that contact works at.

The invention claimed is:

1. A method comprising:
providing, on a computer display, a user interface including a company result column and a contact result column in a single page for simultaneously searching companies and contacts in a database;
displaying a plurality of collapsed company attributes near the company result column in the single page;
displaying a plurality of collapsed contact attributes near the contact result column in the single page;
in response to selection of a one collapsed attribute from the collapsed company or contact attributes, expanding the one collapsed attribute into a plurality of selectable options, each selectable option representing a range of data under the one collapsed attribute, wherein the plurality of selectable options collectively cover the entire range of data in the database under the one collapsed attribute; and in response to selection of a one option from the plurality of selectable options, displaying search results for both companies and contacts in their respective result columns in the single page, the search results corresponding to the range of data represented by the one option.

2. The method of claim 1, wherein the user interface further shows a total number of the search results.

3. The method of claim 1, wherein the collapsed company attributes include company name, industry, number of employees, revenue, ownership, website type, fortune rank, country, state, metro, area code, and zip code.

4. The method of claim 1, wherein the collapsed contact attributes include title, level, department, country, state, metro, area code, zip code, first name, last name, and email.

5. The method of claim 1, wherein the search results are updated upon receiving a new or changed contact attribute.

6. The method of claim 1, further comprising upon detecting a placement of a cursor by the user over a company search result in the company result column, displaying an overlay window with additional company details.

7. The method of claim 1, further comprising upon detecting a placement of a cursor by the user over a contact search result in the contact result column, displaying an overlay window with additional contact details.

8. The method of claim 1, further comprising upon selection by the user of a contact search result displayed in the contact result column, saving the selected contact for later retrieval.

9. The method of claim 8, further comprising upon selection by the user of a button provided by the user interface to purchase the selected contact, providing additional information for the contact.

10. The method of claim 8, wherein the user can select a person to whom the saved contact is assigned by using a pull-down menu of users.

11. A computer-implemented method, comprising:
providing, on a computer display, a user interface including a company result column and a contact result column in a single page for simultaneously searching companies and contacts in a database;
displaying a plurality of collapsed company attributes near the company result column in the single page;
displaying a plurality of collapsed contact attributes near the contact result column in the single page;
in response to selection of a one collapsed attribute from the collapsed company or contact attributes, expanding the one collapsed attribute into a plurality of selectable options, each selectable option representing a range of data under the one collapsed attribute, wherein the plurality of selectable options collectively cover the entire range of data in the database under the one collapsed attribute;
in response to selection of a one option from the plurality of selectable options, displaying search results for both companies and contacts in their respective result columns in the single page, the search results corresponding to the range of data represented by the one option;
enabling, by the user interface, a user to select a person from a predetermined group of persons; and
in response to the user's selection of the person, transmitting the search results to an electronic correspondence address that is associated with the selected person.

12. The method of claim 11, wherein the user interface further shows a total number of the search results.

13. The method of claim 11, wherein the collapsed company attributes include company name, industry, number of employees, revenue, ownership, website type, fortune rank, country, state, metro, area code, and zip code.

14. The method of claim 11, wherein the collapsed contact attributes include title, level, department, country, state, metro, area code, zip code, first name, last name, and email.

15. The method of claim 11, further comprising:
enabling, by the user interface, the user to allow a purchase of additional contact information that is available in the database but not yet displayed in the search result columns.

16. The method of claim 11, further comprising upon detecting a placement of a cursor by the user over a company search result in the company result column, displaying an overlay window with additional company details.

17. The method of claim 11, further comprising upon detecting a placement of a cursor by the user over a contact search result in the contact result column, displaying an overlay window with additional contact details.

18. The method of claim 11, further comprising upon selection by the user of a contact search result displayed in the contact result column, saving the selected contact for later retrieval.

19. The method of claim 18, further comprising upon selection by the user of a button provided by the user interface to purchase the selected contact, providing additional information for the contact.

\* \* \* \* \*